United States Patent
Kaiser et al.

(10) Patent No.: US 9,727,268 B2
(45) Date of Patent: Aug. 8, 2017

(54) MANAGEMENT OF STORAGE IN A STORAGE NETWORK

(71) Applicant: Lyve Minds, Inc., Cupertino, CA (US)

(72) Inventors: Christian M. Kaiser, San Jose, CA (US); Rick Pasetto, Cupertino, CA (US); Stephen Sewerynek, Cupertino, CA (US)

(73) Assignee: LYVE MINDS, INC., Cupertino, CA (US)

( * ) Notice: Subject to any disclaimer, the term of this patent is extended or adjusted under 35 U.S.C. 154(b) by 9 days.

(21) Appl. No.: 14/137,680

(22) Filed: Dec. 20, 2013

(65) Prior Publication Data

US 2014/0195769 A1    Jul. 10, 2014

Related U.S. Application Data (60) Provisional application No. 61/750,324, filed on Jan. 8, 2013, provisional application No. 61/750,319, filed on Jan. 8, 2013.

(51) Int. Cl.
*G06F 3/06* (2006.01)
*G06F 12/02* (2006.01)
(Continued)

(52) U.S. Cl.
CPC .......... *G06F 3/0631* (2013.01); *G06F 3/0604* (2013.01); *G06F 3/064* (2013.01);
(Continued)

(58) Field of Classification Search
CPC ...... G06F 3/0608; G06F 3/0644; G06F 3/065; G06F 3/067; G06F 12/023
See application file for complete search history.

(56) References Cited

U.S. PATENT DOCUMENTS

| 5,881,311 A | 3/1999 | Woods |
| 6,041,342 A | 3/2000 | Yamaguchi |

(Continued)

FOREIGN PATENT DOCUMENTS

| EP | 0986225 A1 | 3/2000 |
| JP | 11508078 A | 7/1999 |

(Continued)

OTHER PUBLICATIONS

International Search Report dated Mar. 20, 2015 as received in Application No. PCT/US2014/071761.

(Continued)

*Primary Examiner* — Edward Dudek, Jr.
(74) *Attorney, Agent, or Firm* — Schwegman, Lundberg & Woessner, P.A.

(57) ABSTRACT

A storage block may include a first portion allocated for storage of network data associated with a storage network. The storage network may include the storage block and one or more other storage blocks. The storage block may further include a second portion allocated for storage of local data. The local data may be associated with one or more programs of a device that includes the storage block. Additionally, the storage block may include a third portion as free space of the storage block. The third portion may be maintained at approximately a target size through adjustments made to an amount of network data stored on the first portion.

20 Claims, 4 Drawing Sheets

(51) Int. Cl.
　　*G06F 11/00* (2006.01)
　　*G06F 17/30* (2006.01)
　　*H04L 29/08* (2006.01)
(52) U.S. Cl.
　　CPC ............. *G06F 3/065* (2013.01); *G06F 3/067* (2013.01); *G06F 3/0608* (2013.01); *G06F 3/0613* (2013.01); *G06F 3/0619* (2013.01); *G06F 3/0649* (2013.01); *G06F 3/0653* (2013.01); *G06F 11/00* (2013.01); *G06F 12/023* (2013.01); *G06F 17/30174* (2013.01); *G06F 17/30581* (2013.01); *H04L 67/1097* (2013.01)

(56) References Cited

U.S. PATENT DOCUMENTS

| | | | |
|---|---|---|---|
| 6,085,192 | A | 7/2000 | Mendez et al. |
| 6,094,672 | A | 7/2000 | Willie et al. |
| 6,470,329 | B1 | 10/2002 | Livschitz |
| 6,629,174 | B1 | 9/2003 | Farkas et al. |
| 6,757,847 | B1 | 6/2004 | Farkash et al. |
| 6,789,258 | B1 | 9/2004 | Zak |
| 6,904,498 | B2 | 6/2005 | Stolowitz |
| 7,076,622 | B2 | 7/2006 | Hsu et al. |
| 7,600,125 | B1 | 10/2009 | Stringham |
| 7,627,643 | B1 | 12/2009 | Ignatoff et al. |
| 7,882,315 | B2 | 2/2011 | Tsai et al. |
| 8,880,838 | B2 | 11/2014 | Kaiser et al. |
| 8,903,959 | B2 | 12/2014 | Kaiser et al. |
| 9,274,707 | B2 | 3/2016 | Kaiser et al. |
| 2001/0055950 | A1 | 12/2001 | Davies et al. |
| 2002/0013832 | A1 | 1/2002 | Hubbard |
| 2002/0120733 | A1 | 8/2002 | Kring |
| 2002/0129290 | A1 | 9/2002 | Couillard |
| 2002/0133508 | A1 | 9/2002 | LaRue et al. |
| 2002/0161911 | A1 | 10/2002 | Pinkney, III et al. |
| 2003/0135541 | A1 | 7/2003 | Maeda et al. |
| 2003/0191827 | A1 | 10/2003 | Piispanen et al. |
| 2003/0229698 | A1 | 12/2003 | Furuhashi et al. |
| 2004/0127242 | A1 | 7/2004 | Dashevsky et al. |
| 2004/0139178 | A1 | 7/2004 | Mendez et al. |
| 2004/0199740 | A1* | 10/2004 | Makela .............. G06F 12/023 711/170 |
| 2004/0225693 | A1 | 11/2004 | Ganji et al. |
| 2004/0230317 | A1 | 11/2004 | Kumar et al. |
| 2005/0038811 | A1 | 2/2005 | Pivowar et al. |
| 2005/0050142 | A1 | 3/2005 | Capone et al. |
| 2006/0015539 | A1 | 1/2006 | Wolf et al. |
| 2006/0085428 | A1 | 4/2006 | Bozeman et al. |
| 2006/0106881 | A1 | 5/2006 | Leung et al. |
| 2006/0224846 | A1 | 10/2006 | Amarendran et al. |
| 2006/0282485 | A1* | 12/2006 | Aggarwal ......... G06F 17/30138 |
| 2006/0288053 | A1 | 12/2006 | Holt et al. |
| 2007/0050551 | A1 | 3/2007 | Jung et al. |
| 2007/0073793 | A1 | 3/2007 | Blandy |
| 2007/0174569 | A1 | 7/2007 | Schnapp et al. |
| 2007/0208748 | A1 | 9/2007 | Li |
| 2007/0275745 | A1 | 11/2007 | Owen |
| 2008/0077628 | A1 | 3/2008 | Gonzalez et al. |
| 2008/0077638 | A1* | 3/2008 | Monk ............... G06F 17/30138 |
| 2008/0140932 | A1 | 6/2008 | Flynn et al. |
| 2008/0294769 | A1 | 11/2008 | Doi et al. |
| 2008/0307094 | A1 | 12/2008 | Karonen et al. |
| 2009/0228669 | A1 | 9/2009 | Slesarev et al. |
| 2009/0265473 | A1 | 10/2009 | Hydrie et al. |
| 2009/0271485 | A1 | 10/2009 | Sawyer et al. |
| 2010/0088271 | A1 | 4/2010 | Brixius et al. |
| 2010/0115078 | A1 | 5/2010 | Ishikawa et al. |
| 2010/0183034 | A1 | 7/2010 | Kroepfl et al. |
| 2010/0238775 | A1 | 9/2010 | Ueno et al. |
| 2010/0241807 | A1 | 9/2010 | Wu et al. |
| 2010/0250492 | A1 | 9/2010 | Dewey |
| 2010/0257219 | A1 | 10/2010 | Patel et al. |
| 2010/0274762 | A1 | 10/2010 | Murphy et al. |
| 2010/0299444 | A1 | 11/2010 | Nilo et al. |
| 2010/0332450 | A1 | 12/2010 | Mills et al. |
| 2011/0113234 | A1 | 5/2011 | Augenstein et al. |
| 2011/0238775 | A1 | 9/2011 | Wu et al. |
| 2011/0265143 | A1 | 10/2011 | Grube et al. |
| 2011/0289366 | A1 | 11/2011 | Baptist et al. |
| 2012/0173900 | A1 | 7/2012 | Diab et al. |
| 2012/0221647 | A1 | 8/2012 | Ciminiera et al. |
| 2012/0290811 | A1 | 11/2012 | Cilibrasi |
| 2013/0185229 | A1 | 7/2013 | Naga et al. |
| 2013/0232215 | A1 | 9/2013 | Gupta et al. |
| 2013/0332505 | A1 | 12/2013 | Karandikar |
| 2013/0340000 | A1 | 12/2013 | Chen et al. |
| 2014/0108474 | A1 | 4/2014 | David et al. |
| 2014/0189264 | A1 | 7/2014 | George et al. |
| 2014/0195482 | A1 | 7/2014 | Kaiser et al. |
| 2014/0195640 | A1 | 7/2014 | Kaiser et al. |
| 2014/0195757 | A1 | 7/2014 | Kaiser et al. |
| 2015/0005859 | A1 | 1/2015 | Thacker |
| 2015/0177999 | A1 | 6/2015 | Gakhal et al. |
| 2016/0132267 | A1 | 5/2016 | Kaiser et al. |

FOREIGN PATENT DOCUMENTS

| | | |
|---|---|---|
| JP | 2004013547 A | 1/2004 |
| JP | 2011513805 A | 4/2011 |
| JP | 2012524947 A | 10/2012 |
| KR | 1020080065490 A | 7/2008 |
| KR | 100994139 B1 | 11/2010 |
| KR | 20120004463 A | 1/2012 |
| TW | 200410216 A | 6/2004 |
| TW | 200723093 A | 6/2007 |
| TW | 200725594 A | 7/2007 |
| TW | M441275 U | 11/2012 |
| WO | 00/23897 A1 | 4/2000 |
| WO | WO-0161495 A1 | 8/2001 |
| WO | WO-2014110142 A1 | 7/2014 |
| WO | WO-2015095851 A1 | 6/2015 |
| WO | WO-2015095852 A1 | 6/2015 |
| WO | WO-2015172093 A1 | 11/2015 |

OTHER PUBLICATIONS

Written Opinion of the International Searching Authority dated Mar. 20, 2015 as received in Application No. PCT/US2014/071761.
TW Office Action dated Feb. 1, 2016 as received in Application No. 103144547.
"U.S. Appl. No, 14/137,654, Non Final Office Action dated Mar. 26, 2014", 13 pgs.
"U.S. Appl. No, 14/137,654, Notice of Allowance dated Aug. 8, 2014", 11 pgs.
"U.S. Appl. No. 14/137,654, Notice of Allowance dated Sep. 2, 2014", 5 pgs.
"U.S. Appl. No. 14/137,654, Preliminary Amendment filed Jan. 17, 2014", 4 pgs
"U.S. Appl. No. 14/137,654, Response filed Jun. 26, 2014 to Non Final Office Action dated Mar. 26, 2014", 15 pgs.
"U.S. Appl. No. 14/137,664, Examiner Interview Summary dated May 28, 2014", 3 pgs.
"U.S. Appl. No. 14/137,664, Non Final Office Action dated Mar. 13, 2014", 16 pgs.
"U.S. Appl. No. 14/137,664, Notice of Allowance dated Jul. 3, 2014", 9 pgs.
"U.S. Appl. No. 14/137,664, Notice of Allowance dated Oct. 14, 2014", 5 pgs.
"U.S. Appl. No. 14/137,664, Preliminary Amendment filed Jan. 17, 2014", 3 pgs.
"U.S. Appl. No. 14/137,664, Response filed Jun. 9, 2014 to Non Final Office Action dated Mar. 13, 2014", 16 pgs.
"U.S. Appl. No. 14/137,691, Final Office Action dated Feb. 22, 2016", 17 pgs.
"U.S. Appl. No. 14/137,691, Final Office Action dated Dec. 12, 2016", 21 pgs.
"U.S. Appl. No. 14/137,691, Non Final Office Action dated Jun. 16, 2016", 22 pgs.

(56) References Cited

OTHER PUBLICATIONS

"U.S. Appl. No. 14/137,691, Non Final Office Action dated Nov. 9, 2015", 15 pgs.
"U.S. Appl. No. 14/137,691, Response filed Jan. 19, 2016 to Non Final Office Action dated Nov. 9, 2015", 12 pgs.
"U.S. Appl. No. 14/137,691, Response filed May 23, 2016 to Final Office Action dated Feb. 22, 2016", 12 pgs.
"U.S. Appl. No. 14/137,691, Response filed Nov. 16, 2016 to Non Final Office Action dated Jun. 16, 2016", 12 pgs.
"U.S. Appl. No. 14/274,443, Final Office Action dated May 11, 2016", 23 pgs.
"U.S. Appl. No. 14/274,443, Non Final Office Action dated Jan. 15, 2016", 27 pgs.
"U.S. Appl. No. 14/274,443, Notice of Allowance dated Jul. 6, 2016", 8 pgs.
"U.S. Appl. No. 14/274,443, Preliminary Amendment filed May 9, 2014", 9 pgs.
"U.S. Appl. No. 14/274,443, Response filed Apr. 12, 2016 to Non Final Office Action dated Jan. 15, 2016", 14 pgs.
"U.S. Appl. No. 14/274,443, Response filed Jun. 24, 2016 to Final Office Action dated May 11, 2016", 9 pgs.
"U.S. Appl. No. 14/531,786, Final Office Action dated Jul. 8, 2015", 8 pgs.
"U.S. Appl. No. 14/531,786, Non Final Office Action dated Dec. 5, 2014", 15 pgs.
"U.S. Appl. No. 14/531,786, Notice of Allowance dated Oct. 23, 2015", 5 pgs.
"U.S. Appl. No. 14/531,786, Response filed Apr. 6, 2015 to Non Final Office Action dated Dec. 5, 2014", 12 pgs.
"U.S. Appl. No. 14/531,786, Response filed Oct. 6, 2015 to Final Office Action dated Jul. 8, 2015", 7 pgs.
"U.S. Appl. No. 14/531,791, Advisory Action dated May 16, 2016", 4 pgs.
"U.S. Appl. No. 14/531,791, Examiner Interview Summary dated Feb. 22, 2016", 3 pgs.
"U.S. Appl. No. 14/531,791, Examiner Interview Summary dated Sep. 2, 2015", 3 pgs.
"U.S. Appl. No. 14/531,791, Final Office Action dated Jan. 21, 2016", 8 pgs.
"U.S. Appl. No. 14/531,791, Non Final Office Action dated Jun. 30, 2016", 10 pgs.
"U.S. Appl. No. 14/531,791, Non Final Office Action dated Jul. 7, 2015", 11 pgs.
"U.S. Appl. No. 14/531,791, Response filed Apr. 12, 2016 to Final Office Action dated Jan. 21, 2016", 10 pgs.
"U.S. Appl. No. 14/531,791, Response filed May 23, 2016 to Advisory Action dated May 16, 2016", 10 pgs.
"U.S. Appl. No. 14/531,791, Response filed Sep. 29, 2015 to Non Final Office Action dated Jul. 7, 2015", 10 pgs.
"U.S. Appl. No. 14/531,791, Response filed Nov. 30, 2016 to Non Final Office Action dated Jun. 30, 2016", 10 pgs.
"U.S. Appl. No. 14/996,132, Final Office Action dated Nov. 17, 2016", 18 pgs.
"U.S. Appl. No. 14/996,132, Non Final Office Action dated May 19, 2016", 19 pgs.
"U.S. Appl. No. 14/996,132, Response filed Aug. 19, 2016 to Non Final Office Action dated May 19, 2016", 10 pgs.
"Canadian Application Serial No. 2900966, Office Action dated Sep. 23, 2016", 5 pgs.
"European Application Serial No. 14737590.1, Extended European Search Report dated Sep. 22, 2016", 8 pgs.
"International Application Serial No. PCT/US2014/010694, International Preliminary Report on Patentability dated Jul. 23, 2015", 6 pgs.
"International Application Serial No. PCT/US2014/010694, International Search Report dated Apr. 30, 2014", 3 pgs.
"International Application Serial No. PCT/US2014/010694, Written Opinion dated Apr. 30, 2014", 4 pgs.
"International Application Serial No. PCT/US2014/010697, International Preliminary Report on Patentability dated Jul. 23, 2015", 7 pgs.
"International Application Serial No. PCT/US2014/010697, International Search Report dated Apr. 30, 2014", 3 pgs.
"International Application Serial No. PCT/US2014/010697, Written Opinion dated Apr. 30, 2015", 5 pgs.
"International Application Serial No. PCT/US2014/071761, International Preliminary Report Patentability dated Jun. 30, 2016", 8 pgs.
"International Application Serial No. PCT/US2014/071762, International Preliminary Report on Patentability dated Jun. 30, 2016", 8 pgs.
"International Application Serial No. PCTIUS2014/071762, International Search Report dated Mar. 30, 2015", 3 pgs.
"International Application Serial No. PCT/US2014/071762, Written Opinion dated Mar. 30, 2015", 6 pgs.
"International Application Serial No. PCT/US2015/030006, International Search Report dated Sep. 14, 2015", 2 pgs.
"International Application Serial No. PCTIUS2015/030006, Written Opinion dated Sep. 14, 2015", 8 pgs.
"Japanese Application Serial No. 2015552745, Office Action dated Oct. 25, 2016", with English translation of claims, 22 pgs.
"Korean Application Serial No. 10-2015-7021377, Notice of Allowance dated Oct. 21, 2016", w/ English Claims, 8 pgs.
"Korean Application Serial No. 10-2015-7021377, Office Action dated May 4, 2016", w/ English Translation, 11 pgs.
"Korean Application Serial No. 10-2016-7009335, Non-Final Office Action dated Dec. 21, 2016", w/ English Translation, 13 pgs.
"Korean Application Serial No. 10-2016-7019712, Office Action dated Jan. 19, 2017", with English translation of claims, 12 pgs.
"Taiwanese Application Serial No. 103100524, Office Action dated Mar. 20, 2015", w/ English Translation, 23 pgs.
"Taiwanese Application Serial No. 103144547, Office Action dated Sep. 14, 2016", w/ English Translation, 10 pgs.
"Taiwanese Application Serial No, 103144548, Office Action dated Feb. 1, 2016", w/ English Translation, 20 pgs.
"Taiwanese Application Serial No. 103144548, Office Action dated Nov. 1, 2016", w/ English Translation and Claims, 15 pgs.
"Taiwanese Application Serial No. 103144548, Response filed Apr. 29, 2016 to Office Action dated Feb. 1, 2016", w/ English pending claims, 20 pgs.
"Taiwanese Application Serial No, 104114307, Office Action dated Mar. 16, 2016", w/ English Translation, 14 pgs.
"U.S. Appl. No. 14/137,691, Advisory Action dated Apr. 21, 2017", 4 pgs.
"U.S. Appl. No. 14/137 69 , Response Filed Apr. 12, 2017 to Final Office Action dated Dec. 12, 2016", 11 pgs.
"U.S. Appl. No. 14/274,443, Notice of Allowance dated Feb. 13, 2017", 11 pgs.
"U.S. Appl. No. 14/531,791, Final Office Action dated Feb. 10, 2017", 10 pgs.
"U.S. Appl. No. 14/531,791, Response Filed Apr. 10, 2017 to Final Office Action dated Feb. 10, 2017", 12 pgs.
"U.S. Appl. No. 14/996.132, Response Filed Apr. 10, 2017 to Final Office Action dated Nov. 17, 2016", 14 pgs.

* cited by examiner

MANAGEMENT OF STORAGE IN A STORAGE NETWORK

CROSS-REFERENCE TO RELATED APPLICATIONS

This application is based upon and claims the benefit of priority of U.S. Provisional Application No. 61/750,324, filed on Jan. 8, 2013, and of U.S. Provisional Application No. 61/750,319, filed on Jan. 8, 2013. The forgoing applications are incorporated herein by reference in their entirety.

FIELD

The embodiments discussed herein are related to management of storage in a storage network.

BACKGROUND

The amount of personal data (e.g., photos, video, documents, etc.) is increasing such that different methods and systems for storing personal data are also increasing. However, many methods and systems of storing personal data may provide other challenges such as being cumbersome and time consuming, providing inadequate redundancy, and not allowing for easy accessibility of the data on different devices, among other things.

The subject matter claimed herein is not limited to embodiments that solve any disadvantages or that operate only in environments such as those described above. Rather, this background is only provided to illustrate one example technology area where some embodiments described herein may be practiced.

SUMMARY

An example embodiment includes A storage block may include a first portion allocated for storage of network data associated with a storage network. The storage network may include the storage block and one or more other storage blocks. The storage block may further include a second portion allocated for storage of local data. The local data may be associated with one or more programs of a device that includes the storage block. Additionally, the storage block may include a third portion as free space of the storage block. The third portion may be maintained at approximately a target size through adjustments made to an amount of network data stored on the first portion.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Some embodiments described herein relate to management of the storage of data on a mobile storage system. An example embodiment includes a storage network that includes one or more devices that include one or more storage agents and one or more storage blocks. The storage network may include a management service that may be referred to as storage network manager in the present disclosure. The storage agents may be configured to manage the collaboratively storage of data between the storage blocks. The storage network manager may be configured to coordinate actions by the one or more storage agents as well as the storage of data within the storage network among the storage blocks. Data associated with the storage network may be referred to as "network data" and may include data files and data objects, as well as metadata associated with the data files and data objects. In some embodiments, the network data may include a catalog of the data stored in the storage network, which in some instances may be a catalog of all of the data stored in the storage network.

One or more storage blocks may include a first portion allocated for storage of network data and a second portion allocated for local data. The local data may be data that may be used and/or managed by one or more programs of the device in which the storage blocks may be included. Additionally, one or more of the storage blocks may include a third portion that is allocated as free space. The third portion may have a target size such that a desired amount of free space may be maintained on the storage block. As detailed below, the amount of storage network data stored on the first portion may be adjusted such that the actual size of the third portion is equal to, or approximately equal to, the target size.

Embodiments of the present disclosure will be explained with reference to the accompanying drawings.

Figure 1:
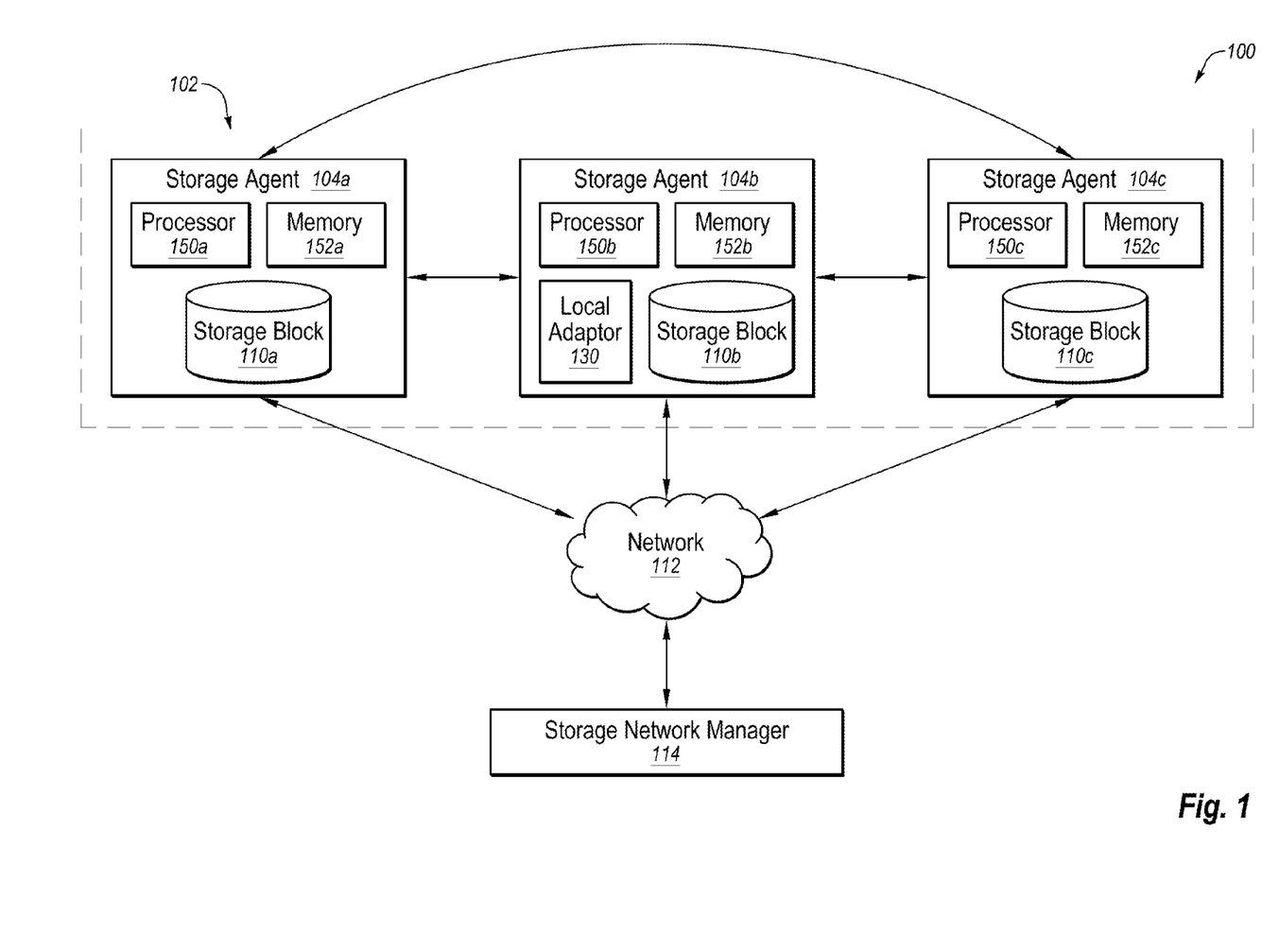
FIG. 1 illustrates a block diagram of an example storage system.

FIG. 1 illustrates a block diagram of an example storage system 100 configured according to at least one embodiment of the present disclosure. The storage system 100 may include a storage network 102 that includes storage agents (SA) 104a-104c. Although the storage system 100 is illustrated as including a single storage network 102 with three different storage agents 104 included therein, the system 100 may include any number of storage networks 102 that may each include any number of storage agents 104.

In some embodiments, the storage system 100 may be configured to store, organize, and manage data files such as photos, videos, documents, etc. In some embodiments, the data files may be included in data objects that may also include metadata that may provide information about the data files. The term "data" in the present disclosure may refer to any suitable information that may be stored by the storage agents 104 and may include one or more data objects, data files, metadata, or any combination thereof.

Additionally, the term "network data" may refer to any data that may be shared by stored on, and/or synchronized between more than one storage agent 104 of the storage network 102. For example, the network data may include data files, metadata, data objects, or other data like data object root and tree structure information, storage agent status information (explained in further detail below), digital rights management (DRM) license information (explained in further detail below), sharing ticket information (explained in further detail below), any other suitable information, or any combination thereof.

The storage system 100 may be configured to organize and manage the data stored in storage blocks 110 that are associated with the storage agents 104a-104c in an automated fashion that may reduce the amount of input required by a user. As such, the storage system 100 may facilitate organization of and access to the data stored by the storage blocks 110 within the storage network 102.

The storage agents 104 may each be associated with a processor 150, memory 152, and a storage block 110. For example, in the illustrated embodiment, the storage agent 104a may include a processor 150a, memory 152a, and a storage block 110a; the storage agent 104b may include a processor 150b, memory 152b, and a storage block 110b; and the storage agent 104c may include a processor 150c, memory 152c, and a storage block 110c.

The processors 150 may include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processors 150 may interpret and/or execute program instructions and/or process data stored in their associated memory 152 and/or one or more of the storage blocks 110.

The memories 152 may include any suitable computer-readable media configured to retain program instructions and/or data for a period of time. By way of example, and not limitation, such computer-readable media may include tangible computer-readable storage media including, Random Access Memory (RAM), Read-Only Memory (ROM), Electrically Erasable Programmable Read-Only Memory (EEPROM), Compact Disk Read-Only Memory (CD-ROM) or other optical disk storage, magnetic disk storage or other magnetic storage devices, flash memory devices (e.g., solid state memory devices), a specific molecular sequence (e.g., DNA or RNA) or any other storage medium which may be used to carry or store desired program code in the form of computer-executable instructions or data structures and which may be accessed by the processors 150. Combinations of the above may also be included within the scope of computer-readable media. Computer-executable instructions may include, for example, instructions and data that cause a general purpose computer, special purpose computer, or special purpose processing device (e.g., the processors 150) to perform a certain function or group of functions.

The storage blocks 110 may be also be any suitable computer readable medium configured to store data and/or data objects. The storage blocks 110 may store network data that may be substantially the same across different storage blocks 110 and may also store local data that may only be found on the particular storage block 110. Although each storage agent 104 is depicted as including a single storage block 110, the storage agents 104 may include any number of storage blocks 110 of any number of computer-readable medium. For example, a storage agent 104 may include a first storage block 110 that is a hard disk drive and a second storage block 110 that is a flash disk drive. Further, a storage block 110 may include more than one type of computer-readable medium. For example, a storage block 110 may include a hard disk drive and a flash drive.

Additionally, more than one storage agent 104 may be associated with the same storage block 110 depending on different implementations and configurations. For example, a storage block 110 may be a Universal Serial Bus (USB) storage device or a Secure Digital (SD) card that may be connected to different storage agents 104 at different times. Additionally, although the storage agents 104 are explicitly depicted as including the processors 150, the memories 152 and the storage blocks 110, different implementations may have different configurations. For example, in some embodiments, the storage agents 104 may be modules included in the memories 152 of their associated devices with computer-executable instructions configured to cause the processors 150 of their associated devices to perform operations associated with managing data that may be stored on the storage blocks 110.

Some functionality of associated with the organization and management of the data within the storage network 102 may be associated with allocation and management of one or more portions in the storage blocks 110. Through the allocation, the efficient use of the storage blocks 110 may be maintained. An example, allocation of the storage blocks 110 and an example management process of the storage blocks 110 is provide with respect to FIGS. 2A-2C.

In some embodiments, one or more of the storage agents 104 may be included with any suitable device that may include the components of the storage agents 104. For example, the storage agents 104 may be included in a cloud storage server, a mobile phone, a tablet computer, a personal computer, a laptop computer, a camera, a personal digital assistant (PDA), a smartphone, a music player, a video player, an external hard drive, etc.

The devices associated with the storage agents 104 may include any device that may allow for communication of data between the storage agents 104. Accordingly, the devices may provide some sort of communication capability between the storage agents 104 such as Internet connectivity, Local Area Network (LAN) connectivity, Wide Area Network (WAN) connectivity, Bluetooth connectivity, 3G connectivity, 4G connectivity, LTE connectivity, Wireless Fidelity (WiFi) connectivity, Machine-to-Machine (M2M) connectivity, Device-to-Device (D2D) connectivity, any other suitable communication capability, or any suitable combination thereof.

As indicated above, the storage agents 104 may perform the above communications via direct communications and/or via network communications. In the illustrated embodiment, the storage agents 104 are depicted as being communicatively coupled to each other directly as well as through a communication network 112. In some embodiments, the communication network 112 may include, either alone or in any suitable combination, the Internet, an Intranet, a local WiFi network, a wireless LAN, a mobile network (e.g., a 3G, 4G, and/or LTE network), a LAN, a WAN, or any other suitable communication network.

The communication of data between the storage agents 104 may accordingly allow for their associated devices to access and use network data that may not necessarily be stored locally on their respective storage blocks 110. As such, the storage network 102 and storage agents 104 may allow for storage of network data while also allowing for access to the network data even when the data is not stored locally on a particular storage agent.

In some embodiments, the storage agents 104 may act similar to clients or servers included in an object-based file system. For instance, the storage agents 104 may be configured to implement protocols associated with communicating data within the storage network 102 and the storage system 100. Additionally, some storage blocks 110 managed by the storage agents 104 may be configured to store only metadata included in various data objects, while other storage blocks 110 may be configured to store metadata and data files included in the various data objects.

In some embodiments, to manage and provide information related to the storage of data in the storage network 102, a catalog of data may be generated and managed for the storage network 102. For example, in some embodiments, the catalog may include information such as which storage blocks 110 may be locally storing data objects, individual data files, and/or any other metadata. The catalog may also include any other metadata that may be associated with the data files. In some embodiments, the catalog may include a collection of all the metadata of the data objects stored in the storage network 102. Accordingly, the catalog may be used to determine which storage block 110 has certain data stored thereon as well as other information about the data stored on the different storage blocks 110. As such, the storage agents 104 may know from where to access data if the data is not stored locally on their respective storage blocks 110.

In some embodiments, the storage agents 104 may be configured to connect to each other and synchronize network data that may be stored across the storage network 102. For example, in some embodiments, the storage blocks 110 may be configured to store all metadata from the catalog associated with the storage network 102 such that each of the associated storage agents 104 may have information (e.g., data file updates, data file deletions, data file additions, etc.) pertaining to the different data files indexed by the catalog. In these and other embodiments, the storage agents 104 may synchronize the catalog between the storage blocks such that they may have up to date information pertaining to the storage network 102.

By synchronizing network data such as the catalog, the storage agents 104 may be aware of or updated as to the statuses of the other storage agents 104 as well as the network data stored within the storage network 102. For example, the first storage agent 104a may be synchronized with the second storage agent 104b and/or the third storage agent 104c such that the first storage agent 104a is updated as to the connectivity or operating status of the second storage agent 104b and/or the third storage agent 104c, as well as the network data stored thereon.

In addition to communicating between each other, in some embodiments, the storage agents 104 may communicate with one or more storage network controllers that may manage the storage of network data throughout the storage network and that may be referred to collectively or individually as a storage network manager 114. The storage network manager 114 may act similarly to a central service in a distributed storage system. The storage network manager 114 may perform multiple functions in the storage system 100 such as coordinating actions by the storage agents 104. For example, the functions of the storage network manager 114 may include, but are not limited to, locating data files within the storage network 102, coordinating synchronization of network data between the storage agents 104, and allocating network data between the storage blocks 110.

In some embodiments, the storage network manager 114 may be included in the same device(s) as the storage agents 104 and, in other embodiments; the storage network manager 114 may be included in one or more devices separate from the storage agents 104. Further, in some embodiments, the storage network manager 114 may perform operations such that the storage network manager 114 may act as and be a storage agent. For example, the storage network manager 114 may store some network data such as the catalog and/or other metadata associated with the storage network 102 and may synchronize its network data with the storage agents 104 such that the storage network manager 114 may act as a storage agent with respect to such network data.

In some embodiments, the storage network manager 114 may communicate with the storage agents 104 via the communication network 112 (as illustrated in FIG. 1). The storage network manager 114 may also be configured to communicate with one or more of the storage agents 104 via a direct communication (not expressly illustrated in FIG. 1) to the respective storage agents 104.

In some embodiments, the storage network manager 114 may be configured such that data files stored in the storage network 102 are not stored on the storage network manager 114, but metadata related to the data files (e.g, the catalog) of the storage network 102 may be stored on the storage network manager 114. In some embodiments, the storage network manager 114 may communicate instructions to the storage agents 104 regarding storage of the data. The storage agents 104 may act in response to the instructions communicated from the storage network manager 114.

The storage agents 104 may locate data files within the storage network 102 according to metadata that may be stored on the storage blocks 110. For example, the storage agent 104a may locate a data file stored on the storage block 110b using the metadata (e.g., catalog) stored on the storage block 110a associated with the storage agent 104a. Some or all the information to locate data files may be communicated during synchronization between the storage agents 104 and/or a storage agent 104 and the storage network manager 114. Additionally or alternatively, the storage agents 104 may communicate with the storage network manager 114 to locate data files stored on the storage network 102.

Additionally, the storage network manager 114 may communicate with one or more of the storage agents 104 with unreliable or intermittent connectivity with other storage agents 104. For example, the storage agent 104c may be communicatively coupled to the storage agent 104b and/or the storage agent 104a using an unreliable connection or the storage agent 104c may be included in an external device that intermittently connects to the storage agent 104b and/or the storage agent 104a. The storage network manager 114 may accordingly communicate with the storage agent 104c via the communication network 112, then relay information (e.g., network data) to the storage agent 104b and/or the storage agent 104a regarding the storage agent 104c and the storage block 110c.

In some embodiments, one or more of the storage agents 104 (or their associated devices) may include a local adaptor 130. In FIG. 1, the local adaptor 130 is depicted as being included in the second storage agent 104b; however, one or more other storage agents 104a and/or 104c or their associated devices may include a local adaptor 130. Generally, the local adaptor 130 may create an interface between the device associated with the storage agent 104b and the storage network 102. In addition, the local adaptor 130 may be configured to perform multiple functions such as, browse and read a catalog of data, create new data objects, and register and unregister adapter-managed data files. For example, the device associated with the storage agent 104b may produce a data object and the local adaptor 130 may be configured to facilitate ingestion of the produced data object into the storage network 102.

In these and other circumstances, the local adaptor 130 may act as a short-term cache for the data object until the data object is ingested into the storage network 102. In an alternative example, the storage network manager 114, one or more of the storage agents 104, or another system may be configured to detect whether a data file of the produced data object is accessible through the local adaptor 130. When the data file is accessible through the local adaptor 130, metadata of the data object may be stored in the storage block 110 such that the data object may be added to the catalog to provide awareness of the data object and associated data file to the other storage agents 104 of the storage network 102. Additionally, when the data file is accessible through the local adaptor 130, the storage network manager 114, the storage agent 104, or another system may be configured to prevent creation of an additional copy of the data file in the storage blocks 110. The data file may thus be assessable by the storage network 102 via the local adaptor 130, essentially creating a simulated link to the data file.

Figure 2A:
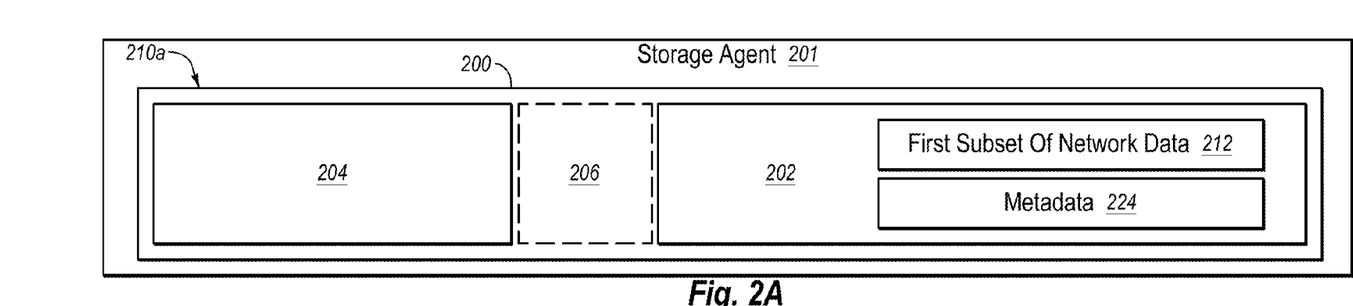
FIGS. 2A-2C illustrate an example allocated storage block that may be implemented in the storage system of FIG. 1.
Figure 2B:
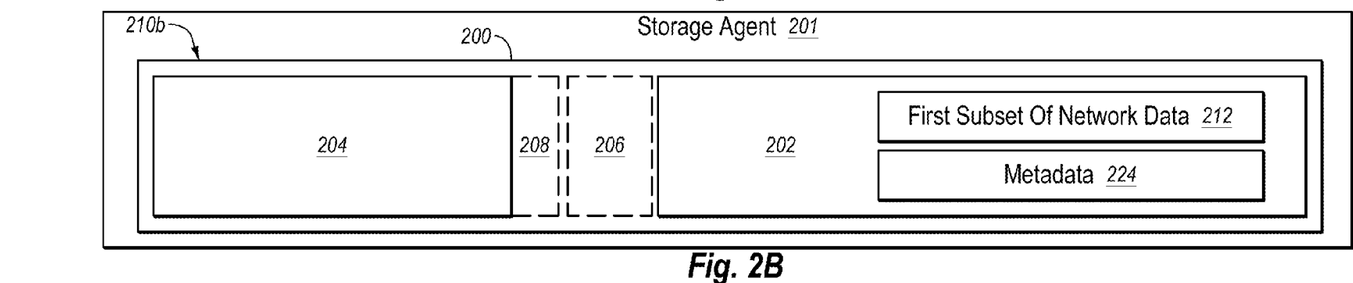
Figure 2C:
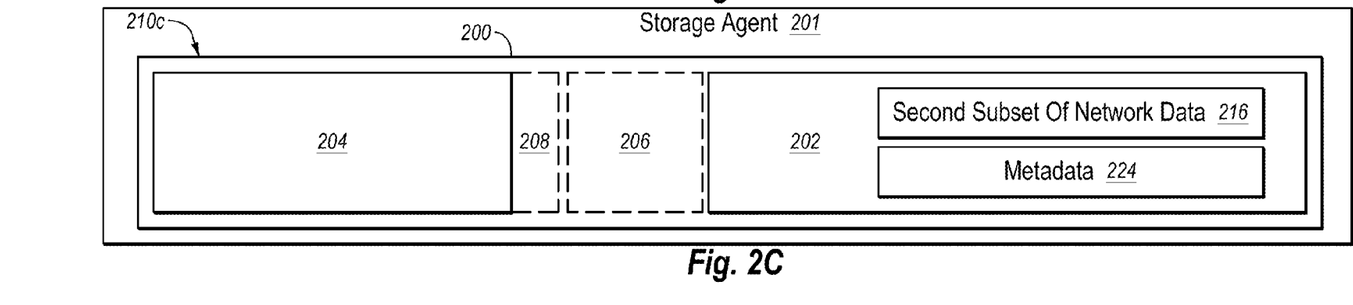

As described in further detail below, the storage blocks 110 may be allocated to store the network data efficiently and to ensure redundancy within the storage network 102 as well as a desired configuration of the storage blocks 110. FIGS. 2A-2C illustrate an example allocated storage block 200 that may be managed by a storage agent 201, in accordance with at least one embodiment described herein. The allocated storage block 200 may be substantially similar to the storage blocks 110 discussed with reference to FIG. 1. The storage agent 201 may be substantially similar to one or more of the storage agents 104 discussed with reference to FIG. 1. The allocated storage block 200 may be included in a storage network such as the storage network 102 of FIG. 1. Additionally, the storage agent 201 and the allocated storage block 200 may be associated with a device such as one of the devices 106 of FIG. 1. The storage network of which the storage agent 201 and allocated storage block 200 may be associated may have a catalog of data that may index the network data stored within the storage network. The allocated storage block 200 may be configured to store metadata 224 of the data objects of the catalog of data and/or data files of the data objects of the catalog of data.

FIGS. 2A-2C include example allocations 210a-210c of the allocated storage block 200, according to at least one embodiment described herein. Specifically, FIG. 2A depicts an initial allocation 210a, FIG. 2B depicts an intermediate allocation 210b, and FIG. 2C depicts a resolved allocation 210c. With combined reference to FIGS. 2A-2C, the allocated storage block 200 may include a first portion 202, a second portion 204, and a third portion 206.

The first portion 202 may be allocated for storage of network data related to the storage network of which the allocated storage block 200 is included. For example, the metadata 224 stored on the first portion 202 may include metadata of each data object of the network data. In some embodiments, the metadata 224 may be arranged as a catalog of data that indexes all of the network data. Additionally, depending on a variety of factors including the amount of storage space in the first portion 202, all of, or a subset of the network data may be stored on the first portion 202. In some embodiments, the size of the first portion 202 e (e.g., the amount of storage space allocated to the first portion 202) may be a minimum amount of storage space or a certain percentage of the storage space of the allocated storage block 200. In other embodiments, the size of the first portion 202 may be the amount of storage space left on the allocated storage block 200 after a desired size for the second portion 204 and a target size for the third portion 206 are met, as explained in further detail below.

In this and other embodiments, whether all of or a subset of the network data is stored on the first portion 202 may be based on the available space of the first portion 202. When the available space of the first portion 202 is larger than the size of the network data, then all of the network data may be stored on the first portion 202. Alternatively, when the available space of the first portion 202 is smaller than the size of the network data, a first subset of network data 212 may be stored on the first portion 202. In some embodiments, a storage network manager such as the storage network manager 114 of FIG. 1 may be configured to allocate which data files of the network data may be included in the first subset of network data 212.

Additionally, in some embodiments, one or more of the data files of the first subset of network data 212 may be designated as secondary copies or primary copies of the data files. The primary copies may be copies that the storage network manager may designate as being stored on the first portion 202 as part of a desired redundancy for the associated data files. Alternatively, the secondary copies be copies of the associated data files stored locally on the allocated storage block 200 in the first portion 202 to facilitate access to the associated data files on the device with which the allocated storage block 200 and the storage agent 201 are associated, but not as part of a desired redundancy. In some embodiments, the secondary copies may be stored in a cache associated with the allocated storage block 200. In some embodiments, the storage agent 201 may be allowed to unilaterally remove secondary copies of data files from the first portion 202 without permission from the storage network manager but not primary copies of data files without permission from the storage network manager.

The second portion 204 of the allocated storage block 200 may be allocated for local data that may be used and/or maintained by one or more programs of the device associated with the storage agent 201 and the allocated storage block 200. For example, the second portion 204 may enable a program that is unrelated to the storage network associated with the first portion 202 to store local data to run and/or process information. A size of the second portion 204 may be based on any number of factors such as, the device type, historical use of the device, a number of programs loaded onto the device, type of programs loaded on the device, etc. For example, the device may include a word processor or a spreadsheet that may generate documents that may be stored on the second portion 204. Accordingly, the size of the second portion 204 may be allocated to accommodate the addition of this type of data.

Additionally, the size of the second portion 204 may generally change or vary based on a number of programs running on the device and/or the number of processes being performed by the programs. For example, the second portion 204 may be initially allocated as having an initial size that is approximately the same size as the local data stored on the allocated storage block 200. When the amount of local data is increased, such as through the addition of a program, the size of the second portion 204 may also increase.

The third portion 206 of the allocated storage block 204 may be allocated as free space. The term "free space" is used to refer to a section of the allocated storage block 200 that may be free of data files, metadata, program files, etc. The third portion 206 may include a target size. The target size may be the desired size of the third portion 206 and may be such to provide flexibility for the addition of data to the allocated storage block 200. In some embodiments, the target size may be a fixed amount of storage space or a percentage of the overall size of the allocated storage block 200.

For example, the target size of the third portion 206 may include a pre-determined percentage of the allocated storage block 200, a certain amount of storage space, or some other target size that enables the functions described herein. As an example, the third portion 206 may be twenty-five percent of a total storage capacity of the storage block 200. Alternatively, the third portion 206 may include a certain amount of bits or bytes. In some embodiments, the target size may be based on an average size of data files of the local data and/or an average size of the data files of the network data, such that the allocated storage block 200 may have room to add applicable data files if needs be.

The size of the third portion 206 may change or vary. For example, when a new data object is added to the allocated storage block 200 (e.g., added to the first portion 202, the second portion 204, or the third portion 206), the amount of free space in the allocated storage block 200 may be reduced. Accordingly, in some instances, the third portion 206 of the allocated storage block 200 may be reduced. For instance, the new data object may include a photograph taken by the device on which the allocated storage block 200 is included. The photograph may be automatically added to the allocated storage block 200 (e.g., to the first portion 202) by an associated adaptor, which may reduce the amount of free storage space on the allocated storage block 200 and consequently may, in some instances, reduce the size of the third portion 206. As another example, in some embodiments, the second portion 204 may increase in size (e.g., through the addition of a program, etc.) such that the third portion 206 may reduce in size. Additionally, in some embodiments, network data may be added to the first portion 202 as directed by the storage network manager such that the size of the third portion 206 may be reduced. Conversely, one or more data files or data objects may be removed from the first portion 202 and/or the second portion 204, which may increase the size of the third portion 206.

The storage agent 201 and/or the storage network manager may be configured to maintain the third portion 206 at approximately the target size by adjusting the amount of network data stored on the first portion 202. For example, in some embodiments, it may be determined that the size of the third portion 206 (e.g., the amount of free space on the allocated storage agent) is greater than the target size of the third portion 206. Accordingly, in some instances the storage agent 201 may inform the storage network manager of this and the storage network manager may allocate additional data files from the network data to be stored on the first portion 202, which may reduce the size of the third portion 206. The allocation of additional data files of the network data to the first portion 202 may be made such that the size of the third portion 206 may be equal to, or approximately equal to, the target size.

Additionally, in some embodiments, it may be determined that the size of the third portion 206 is less than the target size of the third portion 206. For example, the size of the third portion 206 may be reduced due to an addition of data to the first portion 202 and/or the second portion 204. Accordingly, in some instances, the storage agent 201 may remove network data from the first portion 202 such that the size of the third portion 206 may increase. The removal of network data may be performed until the size of the third portion 206 is approximately equal to, or equal to, the target size.

In some embodiments, the storage agent 201 may be configured to first remove data files of the network data that are designated as secondary copies because the secondary copies may not be part of a desired redundancy for their associated data files. In contrast, the storage agent 201 may not be able to remove data files that are designated as primary copies without first receiving permission from the storage network manager. Accordingly, in some embodiments, when there are no more secondary copies of data files stored on the first portion 202 and the size of the third portion 206 is less than the target size, the storage agent 201 may communicate a request to the storage network manager as to which data files may be removed from the first portion 202.

FIGS. 2A-2C illustrate an example progression of actions in the allocated storage block 200 when the second portion 204 increases in size such that the third portion 206 decreases in size below the target size. FIG. 2A illustrates the initial allocation 210a. In the initial allocation, the target size of the third portion 206 may be ten percent of the total storage capacity of the allocated storage block and the size of the third portion 206 may be approximately equal to the target size. Additionally, the second portion 204 may be allocated for local data associated with one or more programs and the first portion 202 may be allocated for storage of metadata 224 and the first subset of network data 212.

FIG. 2B illustrates the intermediate allocation 210b in which the second portion 204 increases to include a part 208 of the third portion 206. For example, a program that may have initially used the second portion 204 may increase storage usage to include the part 208 of the third portion 206. Thus, the third portion 206 may be reduced—e.g., from about ten percent of the storage capacity of the allocated storage block 200 to about seven percent. The intermediate allocation 210b may result for example from one or more programs being loaded and/or run on the device including the allocated storage block 200.

FIG. 2C illustrates the resolved allocation 210c in which the third portion 206 may be increased. Specifically, the third portion 206 may be returned to the target percentage (e.g., of about ten percent) by reallocating some of the first portion 202 into the third portion 206. Thus, the target size of the third portion 206 (e.g., ten percent of the overall size of the allocated storage block 200) may be maintained by reallocating some of the first portion 202 into the third portion 206.

In some embodiments, to reallocate the first portion 202, one or more data files on the first portion 202 may be deleted. For example, with reference to FIGS. 2A and 2C, in the initial allocation 210a, a first subset of network data 212 may be stored on the first portion 202 of the allocated storage block 200. In the resolved allocation of FIG. 2C, a second subset of network data 216 may be stored on the first portion 202, in which the second subset of data files 216 may be smaller than the first subset of data files 212. In embodiments in which the data files may be deleted to maintain the preconfigured percentage, the second subset of data files 216 may include one or more of the first subset of data files 212.

Figure 3:
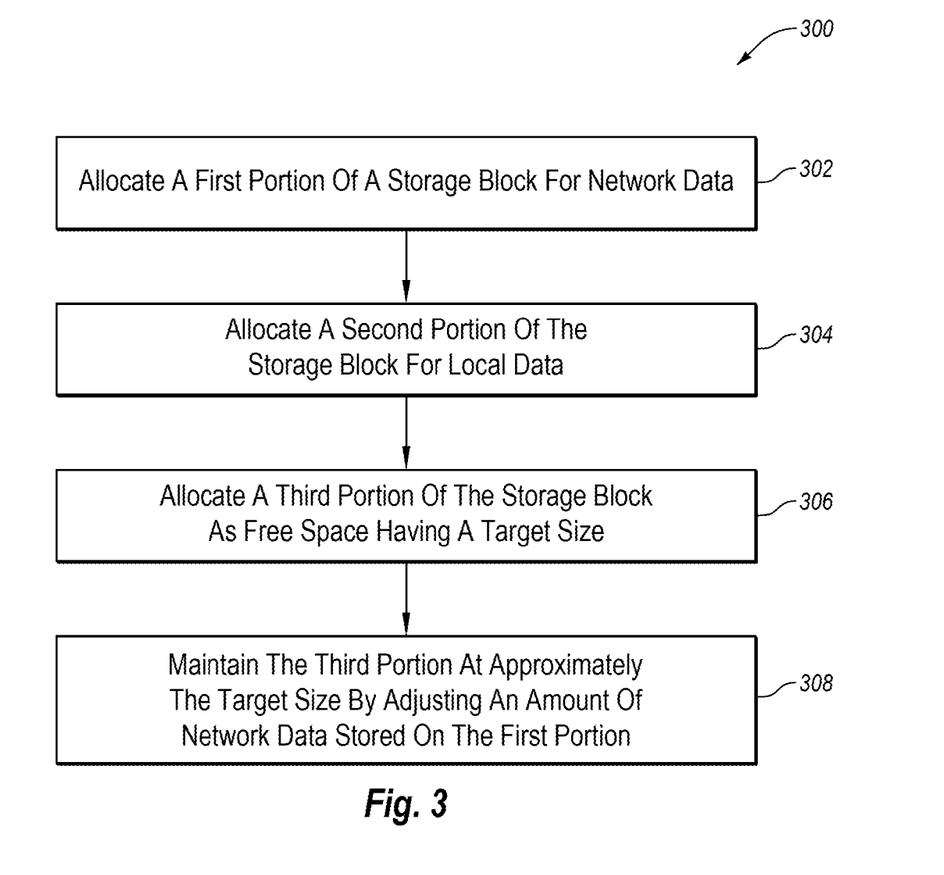
FIG. 3 is a flow diagram of an example method of managing storage allocation on a storage block.

FIG. 3 is a flow chart of an example method 300 of managing storage allocation on a storage block in accordance with at least one embodiment described herein. One or more steps of the method 300 may be implemented, in some embodiments, by a storage agent and/or a storage network manager operating in a storage system, such as the example storage agents 104 and the example storage network manager 114 operating in the example storage system 100 of FIG. 1. For example, one of the storage agents 104 and/or the storage network manager 114 of FIG. 1 may be configured to execute computer instructions to perform operations of managing storage allocation on a storage agent as represented by one or more of the blocks of the method 300. Although illustrated as discrete blocks, various blocks may be divided into additional blocks, combined into fewer blocks, or eliminated, depending on the desired implementation. The method 300 will now be discussed with reference to FIG. 3.

The method 300 may begin at block 302 in which a first portion of a storage block is allocated into a first portion for storage of network data. The network data may be associated with a storage network including the storage block and one or more other storage blocks. At block 304 a second portion of the storage block may be allocated for local data associated with one or more programs of a device that includes the storage block. At block 306, a third portion of the storage block may be allocated as free space of the storage block. The third portion may have a target size associated with a desired amount of free space on the storage block.

At block 308, the size of the third portion may be maintained at approximately the target size by adjusting an amount of network data stored on the first portion. In some embodiments, the size of the third portion may be maintained at approximately the target size according to the method 400 described with respect to FIG. 4 below.

Figure 4:
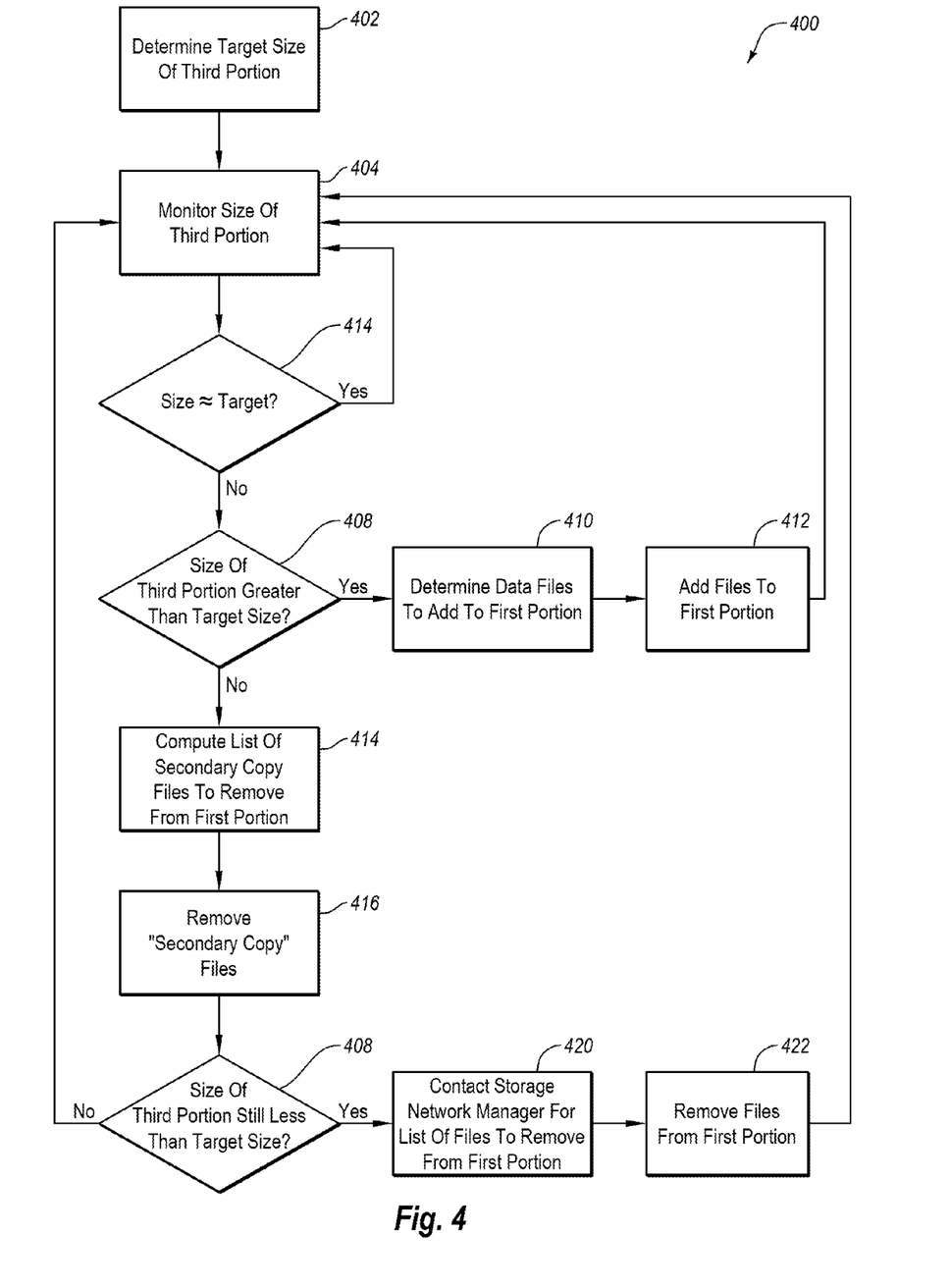
FIG. 4 is a flow diagram of an example method of managing storage on a storage block, all in accordance with at least one embodiment described herein.

FIG. 4 is a flow diagram of an example method 400 of managing storage on a storage block, in accordance with at least one embodiment described herein. One or more steps of the method 400 may be implemented, in some embodiments, by a storage agent and/or a storage network manager operating in a storage system, such as the example storage agents 104 and 201 of FIGS. 1 and 2A-2C, and the example storage network manager 114 operating in the example storage system 100 of FIG. 1. For example, one of the storage agents 104, 201 and/or the storage network manager 114 described above may be configured to execute computer instructions to perform operations of managing storage allocation on a storage agent as represented by one or more of the blocks of the method 400. Although illustrated as discrete blocks, various blocks may be divided into additional blocks, combined into fewer blocks, or eliminated, depending on the desired implementation.

The method 400 will now be discussed with reference to FIG. 4. In some embodiments, the method 400 may be implemented with respect to a storage block that has been allocated into a first portion for network data, a second portion for local data, and a third portion for free space, in a manner as described above with respect to FIGS. 2A-2C and 3. For purposes of explanation, the method 400 is described below with respect to the storage agent 201, the allocated storage block 200 and its associated first portion 202, second portion 204, and third portion 206. However, the method 400 is not limited to this specific implementation.

The method 400 may begin at block 402, where a target size of the third portion 206 may be determined for the allocated storage block 200. In some embodiments, the storage agent 201 may determine the target size of free storage space. In these or other embodiments a storage network manager associated with the storage network of which the allocated storage block 200 may be included may also determine the target size of the third portion 206 and may communicate the target size to the storage agent 201.

As indicated above, the target size may be determined in some embodiments based on a desired amount of free storage space for the allocated storage block 200 such that the allocated storage block 200 may add data if needed or desired. In some embodiments, the target size may be based on average file sizes of the network data, average file sizes of the local data, and/or a total storage capacity of the allocated storage block 200. In these and other embodiments, the target size may be a percentage of the total storage capacity of the allocated storage block 200 or a fixed amount of storage space.

At block 404 the size of the third portion 206 may be monitored. The storage agent 201 and/or the associated storage network manager may perform the monitoring. At block 406, it may be determine whether the size of the third portion 206 is approximately equal to, or equal to, the target size related to the desired amount of free storage space. Once again, the storage agent 201 and/or the associated storage network manager may make this determination. When the size of the third portion 206 is approximately equal to, or equal to, the target size, the method 400 may return to block 404 for monitoring of the size of the third portion 206. When the size of the third portion 206 is not approximately equal to, or equal to, the target size, the method 400 may proceed to block 408.

At block 408, it may be determined whether the size of the third portion 206 is greater than the target size. When the size of the third portion 206 is greater than the target size, the method 400 may proceed to block 410 in some embodiments. When the size of the third portion 206 is greater than the target size, the allocated storage block 200 may be able to store more data such as network data. Accordingly, in some embodiments, at block 410, it may be determined which data files of the network data may be added to the first portion 202.

In some embodiments, at block 410, certain data files of the network data may have been allocated to the first portion 202 by the storage network manager, but all of the data files allocated to the first portion 202 may not have been saved to the first portion 202 yet. As such, it may be determined that one or more of these data files should be added to the first portion 202 at block 410. In these or other embodiments, all of the allocated data files may be stored on the first portion 202, or the allocation may be out of date, such that the storage network manager may generate a list of data files of the network data that may be added to the first portion 202 according to any suitable allocation scheme. Accordingly, in some embodiments, it may be determined at block 410 that one or more data files of the list of data files generated by the storage network manager should be added to the first portion 202. In some embodiments, the storage network manager may be configured to monitor the first portion 202 and may unilaterally generate the list, while in other embodiments the storage agent 201 may request the list from the storage network manager.

At block 412, the data files of the network data determined to be added to the first portion 202 in block 210 may be added to the first portion 202. In some embodiments, the data files of the network data may be added to the first portion 202 from one or more other storage blocks that may be included in the storage network of which the storage agent 201 is included. Following block 412, the method 400 may return to block 404. In some embodiments, the method 400 may omit blocks 410 and 412 and the method 400 may proceed back to block 404 from block 408 when the size of the third portion is greater than the target size.

Returning to block 408 where it may be determined whether the size of the third portion 206 is greater than the target size. When the size of the third portion 206 is less than the target size, the method 400 may proceed to block 414 in some embodiments. At block 414, a list of data files stored on the first portion 202 as secondary copies may be generated. At block 416, one or more of the data files designated as secondary copies may be removed. The storage agent 201 and/or the storage network manager may be configured to generate and/or execute the instructions associated with blocks 414 and 416. The secondary copies of the data files may be removed first in some instances because as mentioned above, they may not be very important with respect to a desired redundancy of their associated data. Additionally, the storage agent 201 may be able to perform the operations associated with blocks 414 and 416 without explicit authorization from the storage network manager due to the operations being related to secondary copies of the data files.

At block 418, it may be determined whether the size of the third portion 206 is still less than the target size after deleting one or more of the secondary copies. In some embodiments, when the size of the third portion 206 is still less than the target size, more secondary copies may be deleted if all of them have not been deleted already. In these and other embodiments, at block 420, when the size of the third portion 206 is still less than the target size, the storage agent 201 may contact the storage network manager for a list of one or more data files that may be removed from the first portion 202. The storage network manager may generate the list based on the allocation scheme that may be used by the storage network manager to allocate network data to the storage agent 201. At block 422, the storage agent 201 may remove data files from the first portion 202 according to the list generated by the storage network manager with respect to the request generated at block 420. Following block 422, the method 400 may return to block 404.

Accordingly, the methods 300 and/or 400 may be used to manage the storage of data on a storage block. One skilled in the art will appreciate that, for these and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. Additionally, although specific elements may be disclosed as performing specific steps, in some embodiments a different element may perform the same steps. The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other non-transitory storage medium which may be used to carry or store desired program code means in the form of computer-executable instructions or data structures and which may be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of managing storage allocation on a storage block, the method comprising:
   allocating a first portion of the storage block for storage of network data associated with a storage network including the storage block and one or more other storage blocks;
   allocating a second portion of the storage block for storage of local data associated with one or more programs of a device that includes the storage block;
   allocating a third portion of the storage block as free space of the storage block, the third portion having a target size based on a target amount of free space on the storage block, the target size being based on: average file size of data files of the network data and average file size of data files of the local data;
   maintaining the third portion at approximately the target size by adjusting an amount of network data stored on the first portion while maintaining an amount of local data stored on the second portion;
   determining whether an overall size of the network data is larger than available space on the first portion; and
   in response to determining that the overall size of the network data is larger than the available space on the first portion, storing, on the first portion, a catalog of data including information about data files of the network data and storing a subset of the data files of the network data on the first portion instead of storing all the data files of the network data on the first portion in response to determining that the overall size of the network data is smaller than the available space on the first portion.

2. The method of claim 1, wherein maintaining the third portion at approximately the target size comprises adding network data to the first portion from the one or more other storage blocks of the storage network when an actual size of the third portion is greater than the target size of the third portion.

3. The method of claim 2, further comprising adding the network data to the first portion according to instructions received from storage network manager of the storage network.

4. The method of claim 1. wherein maintaining the third portion at approximately the target size comprises removing network data from the first portion when an actual size of the third portion is less than the target size of the third portion.

5. The method of claim 4, further comprising removing one or more data files of the network data designated as secondary copies first.

6. The method of claim 4, further comprising removing the network data according to instructions received from a storage network manager of the storage network.

7. The method of claim 1, wherein the target size is a percentage of a total storage capacity of the storage block or a fixed amount of storage space.

8. A storage block comprising:
 a first portion allocated for storage of network data associated with a storage network including one or more other storage blocks;
 a second portion allocated for storage of local data associated with one or more programs of a device that includes the storage block; and
 a third portion allocated as free space of the storage block, the third portion being maintained at approximately a target size through addition and subtraction of an amount of network data stored on the first portion while maintaining an amount of local data stored on the second portion.

9. The storage block of claim 8, wherein, to maintain the third portion at approximately the target size, network data is added to the first portion from the one or more other storage blocks of the storage network when an actual size of the third portion is greater than the target size of the third portion.

10. The storage block of claim 9, wherein the network data is added according to instructions received from a storage network manager of the storage network.

11. The storage block of claim 8, wherein to maintain the third portion at approximately the target size, network data is removed from the first portion when an actual size of the third portion is less than the target size of the third portion.

12. The storage block of claim 11, wherein the network data is removed according to instructions received from a storage network manager of the storage network.

13. The storage block of claim 11, wherein one or more data files the network data that are designated as secondary copies are removed first.

14. The storage block of claim 8, wherein the target size is a percentage of a total storage capacity of the storage block or a fixed amount of storage space.

15. The storage block of claim 8, wherein the target size is based on one or more of the following: average file sizes of data files of the network data and average file sizes of data files of the local data.

16. A non-transitory computer-readable storage medium including instructions that cause a system to perform operations to manage storage allocation on a storage agent, the operations comprising:
 allocating a first portion of a storage block for storage of network data associated with a storage network including the storage block and one or more other storage blocks;
 allocating a second portion of the storage block for storage of local data associated with one or more programs of a device that includes the storage block;
 allocating a third portion of the storage block as free space of the storage block, the third portion having a target size associated with a target amount of free space on the storage block; and
 maintaining the third portion at approximately the target size by addition and subtraction of an amount of network data stored on the first portion while maintaining an amount of local data stored on the second storage block.

17. The non-transitory computer-readable storage medium of claim 16, wherein maintaining the third portion at approximately the target size comprises adding network data to the first portion from the one or more other storage blocks of the storage network when an actual size of the third portion is greater than the target size of the third portion.

18. The non-transitory computer-readable storage medium of claim 16, wherein maintaining the third portion at approximately the target size comprises removing network data from the first portion when an actual size of the third portion is less than the target size of the third portion.

19. The non-transitory computer-readable storage medium of claim 16, wherein the target size is based on one or more of the following: average file sizes of data files of the network data and average file sizes of data files of the local data.

20. The non-transitory computer-readable storage medium of claim 16, wherein the operations further include removing secondary copies of data files based on a desired redundancy of data.

* * * * *

UNITED STATES PATENT AND TRADEMARK OFFICE
CERTIFICATE OF CORRECTION

PATENT NO. : 9,727,268 B2
APPLICATION NO. : 14/137680
DATED : August 8, 2017
INVENTOR(S) : Kaiser et al.

Page 1 of 1

It is certified that error appears in the above-identified patent and that said Letters Patent is hereby corrected as shown below:

On the Title Page

On page 3, in Column 2, item (56), under "Other Publications", Line 14, delete "Apr. 30, 2015"," and insert --Apr. 30, 2014",-- therefor On page 3, in Column 2, item (56), under "Other Publications", Line 21, delete "PCTIUS2014/071762," and insert --PCT/US2014/071762,-- therefor On page 3, in Column 2, item (56), under "Other Publications", Line 27, delete "PCTIUS2015/030006," and insert --PCT/US2015/030006,-- therefor On page 3, in Column 2, item (56), under "Other Publications", Line 54, delete "14/137 69 ," and insert --14/137,691,-- therefor In the Claims In Column 14, Line 54, in Claim 1, delete "on:" and insert --on-- therefor In Column 14, Line 65, in Claim 1, delete "storing," and insert --storing-- therefor In Column 15, Line 17, in Claim 4, delete "claim 1." and insert --claim 1,-- therefor Signed and Sealed this
Eighteenth Day of June, 2019

Andrei Iancu
*Director of the United States Patent and Trademark Office*